US006980520B1

(12) United States Patent
Erimli

(10) Patent No.: US 6,980,520 B1
(45) Date of Patent: Dec. 27, 2005

(54) METHOD AND APPARATUS FOR PERFORMING SOURCE-BASED FLOW CONTROL ACROSS MULTIPLE NETWORK DEVICES

(75) Inventor: Bahadir Erimli, Campbell, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 880 days.

(21) Appl. No.: 09/877,122

(22) Filed: Jun. 11, 2001

(51) Int. Cl.[7] .......................................... G01R 31/08
(52) U.S. Cl. .................................... 370/236; 370/392
(58) Field of Search ................................ 370/232, 237, 370/352, 389, 392, 231, 236, 236.1, 236.2, 370/242, 241.1

(56) References Cited

U.S. PATENT DOCUMENTS

| | | | |
|---|---|---|---|
| 6,035,333 A * | 3/2000 | Jeffries et al. ............... | 709/224 |
| 6,170,022 B1 * | 1/2001 | Linville et al. ............... | 710/29 |
| 6,181,699 B1 | 1/2001 | Crinion et al. .............. | 370/392 |
| 6,212,582 B1 | 4/2001 | Chong et al. .................. | 710/57 |
| 6,405,258 B1 * | 6/2002 | Erimli et al. ............... | 709/235 |
| 6,628,613 B1 * | 9/2003 | Joung et al. ................. | 370/230 |
| 6,667,985 B1 | 12/2003 | Drummond-Murray ..... | 370/415 |
| 6,721,273 B1 | 4/2004 | Lyon ........................... | 370/235 |

OTHER PUBLICATIONS

U.S. Appl. No. 09/752,719, filed Jan. 3, 2001.
W. Noureddine et al.; Selective Back-Pressure in Switched Ethernet Lans; Global Telecommunications Conference; Globecom 1999; pp. 1256-1263.
Rich Seifert; RE: Priority Service and 802.3 Flow Control; Internet Discussion Board; Jun. 21, 1996; 1 page.
Ariel Hendel; RE: Priority Service and 802.3 Flow Control; Internet Discussion Board; Jun. 21, 1996; 1 page.
J.K. Roussos et al; Congestion Control Protocols for Interconnected Lans Supporting Voice and Data Traffic; Computer Communications; vol. 17, No. 1; Jan. 1994; pp. 25-34.
Rich Seifert; The Switch Book; John Wiley & Sons, Inc.; 2000; pp. 520-544.
Aydemir et al.; "Flow Control in Gbs Ethernet Networks"; IBM; Nov. 11, 1998.
Bill Bunch, "An Introduction to Auto-Negotiation", Feb. 1995, http://www.scyld.com/NWay.html, 12 pages.

* cited by examiner

*Primary Examiner*—Chau Nguyen
*Assistant Examiner*—Ian N. Moore
(74) *Attorney, Agent, or Firm*—Harrity & Snyder, LLP

(57) ABSTRACT

A network device that controls the communication of data frames between stations receives data frames from a number of stations. The network device detects a congestion condition associated with processing the received data frames and generates a pause frame including source address information relating to the source of the congestion. The network device transmits the pause frame to a second network device. The second network device identifies the source address included in the pause frame and suspends transmission of data frames with that source address to the network device. The second network device may also transmit the pause frame including the source address to a third network device.

19 Claims, 6 Drawing Sheets

METHOD AND APPARATUS FOR PERFORMING SOURCE-BASED FLOW CONTROL ACROSS MULTIPLE NETWORK DEVICES

CROSS-REFERENCE TO RELATED APPLICATIONS

This application is related to the following commonly-assigned, copending application: U.S. Ser. No. 09/752,719 entitled METHOD AND APPARATUS FOR PERFORMING PRIORITY-BASED FLOW CONTROL.

TECHNICAL FIELD

The present invention relates generally to network communications and, more particularly, to flow control across multiple network devices.

BACKGROUND ART

In computer networks, a number of network stations are typically interconnected via a communications medium. For example, Ethernet 802.3 is a commonly used local area network (LAN) scheme in which multiple stations are connected to a shared or dedicated serial data path. These stations often communicate with a switch located between the data path and the stations connected to that path. The switch typically controls the communication of data and includes logic for receiving and forwarding data frames to their appropriate destinations.

When all of the stations connected to the network are simultaneously operating and transmitting data at high speeds, data traffic on the switch may become heavy. Accordingly, some switches implement a flow control scheme using "pause" frames. For example, when some sort of congestion on the switch occurs, the switch may transmit a media access control (MAC) control pause frame to stations connected to the switch. The pause frame instructs the stations receiving the pause frame to stop sending data for a period of time.

A drawback with conventional flow control schemes, such as those using pause frames, is that a switch is unable to selectively suspend data transmissions from a network station that is included in the network without suspending data transmissions from other network stations connected to the switch. In networks that include a large number of stations, transmitting conventional pause frames may reduce data throughput by pausing data transmissions from stations not associated with the congestion condition.

DISCLOSURE OF THE INVENTION

There exists a need for an apparatus and method for implementing source-based flow control in a network. These and other needs are met by the present invention, where a first switch detects a congestion condition and transmits a pause frame via the network. The pause frame includes source address information relating to the source of the congestion. When a second switch receives the pause frame, it stops sending data frames associated with the source address included in the pause frame to the first switch. The second switch may also forward a similar pause frame via the network.

According to one aspect of the present invention, a first network device configured to control communications in a network is provided. The first network device includes a logic device configured to detect a condition associated with a resource on the first network device. The first network device also includes flow control logic configured to generate a pause frame requesting suspension of data traffic in response to the detection of the condition, the pause frame including a source address of a data frame associated with the condition. The first network device further includes a transmit device configured to transmit the pause frame to at least a second network device.

Another aspect of the present invention provides a method for controlling communications in a network. The method includes receiving data frames on input ports of a first network device, processing the received data frames to generate data forwarding information and transmitting the received data frames via output ports on the first network device to their intended destinations based on the data forwarding information. The method also includes detecting a condition on the first network device and generating a pause frame requesting suspension of data traffic in response to detecting the condition. The pause frame includes a source address of a received data frame associated with the condition. The method further includes transmitting the pause frame to at least a second network device.

Other advantages and features of the present invention will become readily apparent to those skilled in this art from the following detailed description. The embodiments shown and described provide illustration of the best mode contemplated for carrying out the invention. The invention is capable of modifications in various obvious respects, all without departing from the invention. Accordingly, the drawings are to be regarded as illustrative in nature, and not as restrictive.

BRIEF DESCRIPTION OF THE DRAWINGS

Reference is made to the attached drawings, wherein elements having the same reference number designation represent like elements throughout.

BEST MODE FOR CARRYING OUT THE INVENTION

The present invention will be described with the example of a switch in a packet switched network, such as an Ethernet (IEEE 802.3) network. It will become apparent, however, that the present invention is also applicable to other packet switched systems, as described in detail below, as well as to other types of systems in general.

Switch Architecture Overview

Figure 1:
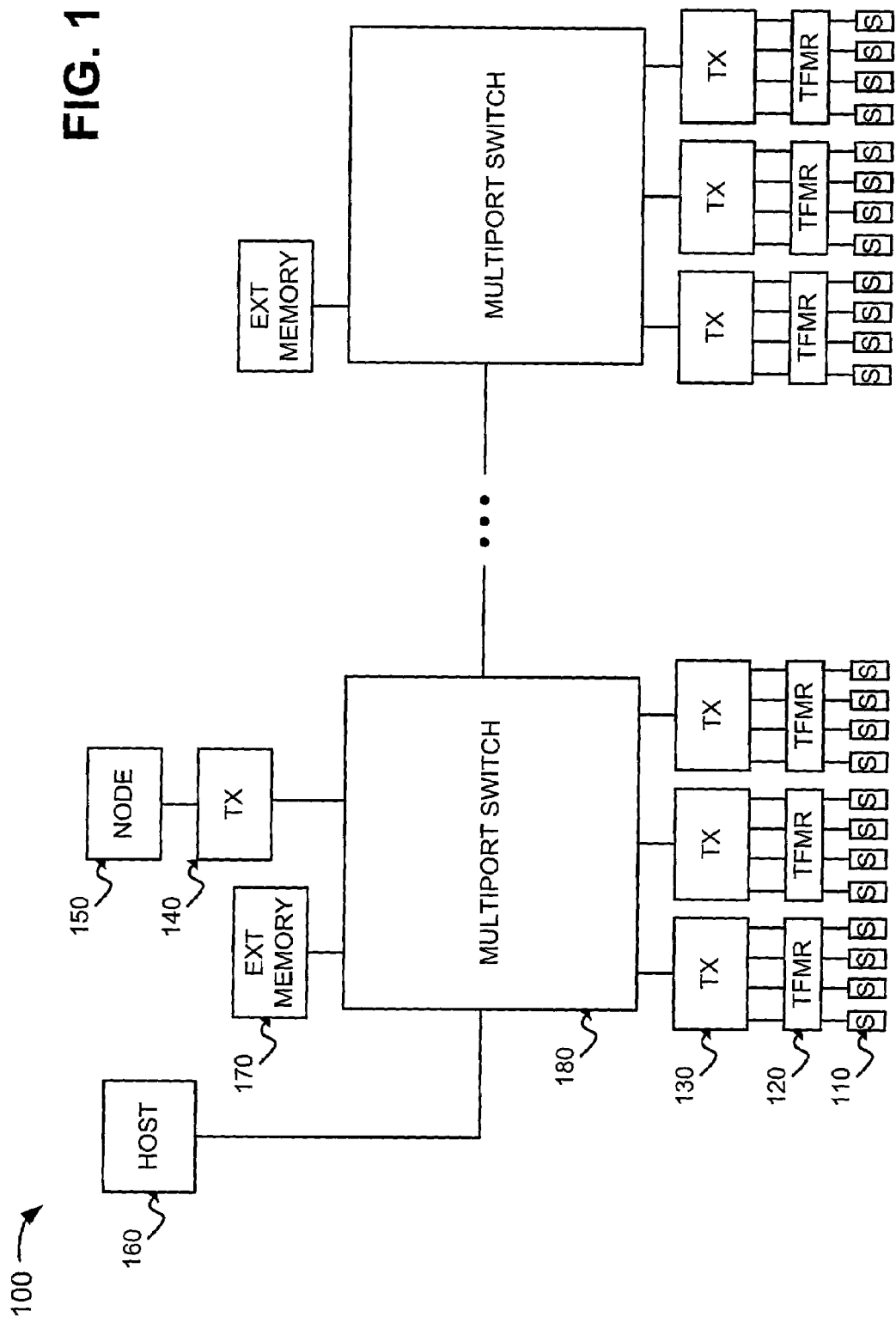
FIG. 1 is a block diagram of an exemplary system in which methods and systems consistent with the present invention may be implemented.

FIG. 1 is a block diagram of an exemplary system in which systems and methods consistent with the present invention may be implemented. The exemplary system may include a packet switched network 100, such as an Ethernet (IEEE 802.3) network. The packet switched network 100 may include network stations 110, transformers 120, transceivers 130 and 140, a network node 150, a host 160, external memories 170, and multiport switches 180. The network stations 110 may include conventional communication devices, such as computers, with different configurations. For example, the devices may send and receive data at network data rates of 10 megabits per second (Mb/s) or 100 Mb/s.

Each 10/100 Mb/s network station 110 may send and receive data to and from a multiport switch 180 according to either a half-duplex or full duplex Ethernet protocol. The Ethernet protocol ISO/IEC 8802-3 (ANSI/IEEE Std. 802.3, 1993 Ed.) defines a half-duplex media access mechanism that permits all stations 110 to access the network channel with equality. Traffic in a half-duplex environment may not be distinguished over the transmission medium. Rather, each half-duplex station 110 may include an Ethernet interface card that uses carrier-sense multiple access with collision detection (CSMA/CD) to listen for traffic on the transmission medium. The absence of network traffic is detected by sensing deassertion of a receive carrier on the transmission medium.

Any station 110 having data to send may attempt to access the channel by waiting a predetermined amount of time, known as the interpacket gap interval (IPG), after deassertion of the receive carrier on the transmission medium. If multiple stations 110 are connected to the same link, each of the stations 110 may attempt to transmit data in response to the sensed deassertion of the receive carrier and after the IPG interval, possibly resulting in a collision. Hence, the transmitting station 110 may monitor the transmission medium to determine if there has been a collision due to another station 110 sending data on the same link at the same time. If a collision is detected, both stations 110 cease transmitting, wait a random amount of time, and then retry the transmission.

The 10/100 Mb/s network stations 110 that operate in full duplex mode may send and receive data packets according to the Ethernet standard IEEE 802.3u. The full duplex environment provides a two-way, point-to-point communication link enabling simultaneous transmission and reception of data packets between each link partner (i.e., the 10/100 Mb/s network station 110 and the corresponding multiport switch 180).

The transformers 120 may include magnetic transformers that provide AC coupling between the network stations 110 and the transceivers 130. The transceivers 130 may include 10/100 Mb/s physical layer transceivers that communicate with the multiport switches 180 via respective serial media independent interfaces (SMIIs) or reduced media independent interfaces (RMIIs). Each of the transceivers 130 may be configured to send and receive data packets between the multiport switch 180 and up to four network stations 110 via the SMII/RMII. The SMII/RMII may operate at a data rate sufficient to enable simultaneous transmission and reception of data packets by each of the network stations 110 and the corresponding transceiver 130.

The transceiver 140 may include one or more 1000 Mb/s (i.e., 1 Gb/s) physical layer transceivers that provide communication with nodes, such as the network node 150, via, for example, a high speed network transmission medium. The network node 150 may include one or more 1 Gb/s network nodes that send and receive data packets at a network speed of 1 Gb/s. The network node 150 may include, for example, a server or a gateway to a high-speed backbone network.

The host 160 may include a computer device that provides external management functions to control the overall operation of the multiport switches 180. The external memories 170 may include synchronous static random access memories (SSRAMs) that provide external storage for the multiport switches 180. Each of the external memories 170 may include a Joint Electron Device Engineering Council (JEDEC) pipelined burst or Zero Bus Turnaround (ZBT) SSRAM having a 64-bit wide data path and a 17-bit wide address path. The external memories 170 may be addressable as upper and lower banks of 128K in 64-bit words. The size of the external memories 170 is preferably at least 1 Mbyte with data transfers possible on every clock cycle through pipelining.

The multiport switches 180 selectively forward data packets received from the network stations 110 or the network node 150 to the appropriate destination according to the appropriate transmission protocol, such as the Ethernet protocol.

Figure 2:
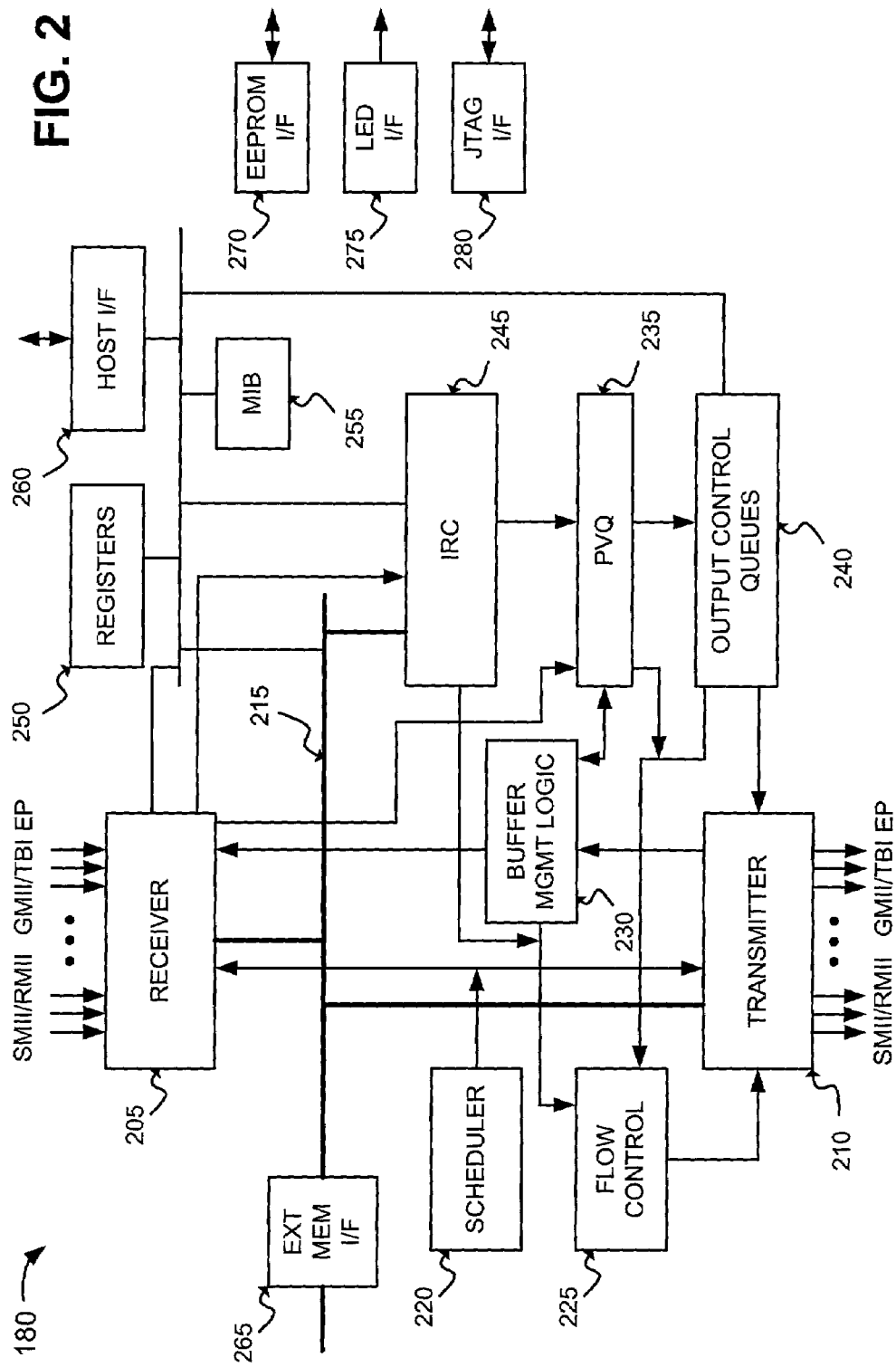
FIG. 2 is an exemplary detailed block diagram of the multiport switch of FIG. 1.

FIG. 2 is a detailed diagram of the multiport switch 180 according to an implementation consistent with the present invention. The multiport switch 180 may include a receiver 205, a transmitter 210, a data bus 215, a scheduler 220, flow control logic 225, buffer management logic 230, a port vector queue (PVQ) 235, output control queues 240, an internal rules checker (IRC) 245, registers 250, management information base (MIB) counters 255, a host interface 260, an external memory interface 265, an EEPROM interface 270, an LED interface 275, and a Joint Test Action Group (JTAG) interface 280.

The receiver 205 may include media access control (MAC) modules and receive buffers, such as first-in, first-out (FIFO) buffers. The receive modules may include input ports that support SMIIs, RMIIs, gigabit media independent interfaces (GMIIs), ten bit interfaces (TBIs), and proprietary interfaces for expansion with other multiport switches 180 (FIG. 1). The expansion ports (EPs) may be used to transfer data between other multiport switches 180 according to a prescribed protocol. The expansion ports may permit the multiport switches 180 to be cascaded together to form a backbone network. Each of the receive modules may include queuing logic that receives data packets from the network stations 110 and/or network node 150 and stores the packets in the corresponding receive FIFOs. The queuing logic may then send portions of the packets to the IRC 245 for processing and to the external memory 170 for storage via the external memory interface 265.

The transmitter 210 may include MAC modules and transmit buffers, such as FIFO buffers. The transmit modules may include output ports that support SMIIs, GMIIs, TBIs, and proprietary interfaces for expansion with other multiport switches 180. Each of the transmit modules may include dequeuing logic that obtains packets from the external memory 170 and stores the packets in the corresponding transmit FIFOs. The transmit modules may read the data packets from the corresponding transmit FIFOs and transmit the packets to the network stations 110 and/or network node 150. In an alternative implementation consistent with the present invention, the functions of the receiver 205 and transmitter 210 may be performed by a transceiver that manages both the receiving and transmitting of data packets.

The data bus 215 may include one or more conductors that connect the receiver 205, the transmitter 210, the IRC 245, and the external memory interface 265. The scheduler 220 may include logic that controls access to the external memory 170 by the queuing and dequeuing logic of the receiver 205 and transmitter 210, respectively. The multiport switch 180 is configured to operate as a non-blocking switch, where network data is received and transmitted from the switch ports at the respective wire rates of 10, 100, or 1000 Mb/s. Hence, the scheduler 220 may control the access by different ports to optimize use of the bandwidth of the external memory 170.

The flow control logic 225 may include logic that operates in conjunction with the buffer management logic 230, the PVQ 235, and the output control queues 240 to control the transmission of packets by the transmitter 210. The flow control logic 225 may control the transmitter 210 so that the transmitter 210 outputs packets in an efficient manner based on the volume of data traffic. The buffer management logic 230 may include logic that oversees the use of memory within the multiport switch 180. For example, the buffer management logic 230 may manage the use of frame pointers and the reuse of frame pointers once the data packet has been transmitted to its designated output port(s). Frame pointers identify the location of data frames stored in the external memory 170 that require transmission.

The PVQ 235 may include logic that obtains a frame pointer to the appropriate output queue(s) in output control queues 240 that correspond to the output ports to receive the data frame transmission. For multicopy frames, the PVQ 235 may supply multiple copies of the same frame pointer to more than one output queue. The output control queues 240 may include a FIFO-type output queue corresponding to each of the transmit modules in the transmitter 210. Each of the output queues may include multiple priority queues for frames having different levels of priority. For example, a high priority queue may be used for frames that require a lower access latency (e.g., frames for multimedia applications or management frames). The frame pointers stored in the FIFO-type output queues may be processed by the dequeuing logic for the respective transmit modules. The dequeuing logic uses the frame pointers to access the external memory 170 to read data frames at the memory locations specified by the frame pointers.

The IRC 245 may include an internal decision making engine that makes frame forwarding decisions for data packets that are received by the receiver 205. The IRC 245 may monitor (i.e., "snoop") the data bus 215 to determine the frame pointer value and a part of the data frame, for example, the header information of a received packet, including the source, destination, and virtual local area network (VLAN) address information. The IRC 245 may use the header information to determine which output port will output the data frame stored at the location specified by the frame pointer. The IRC 245 may, thus, determine that a given data frame should be output by either a single port (i.e., unicast), multiple ports (i.e., multicast), all ports (i.e., broadcast), or no port (i.e., discarded).

For example, each data frame may include a header that identifies the source and destination addresses. The IRC 245 may use the destination address to identify the appropriate output port to output the data frame. The frame header may also include VLAN address information that identifies the frame as information destined to one or more members of a group of network stations 110. The IRC 245 may alternatively determine that a data frame should be transferred to another multiport switch 180 via the expansion port. Therefore, the IRC 245 determines whether a frame temporarily stored in the external memory 170 should be output to a single output port, multiple output ports, no output port, or another multiport switch 180.

The IRC 245 may output its forwarding decision to the PVQ 235 in the form of a forwarding descriptor. The forwarding descriptor may include, for example, a priority class identifying whether the data frame is high priority or low priority, a port vector identifying each output port that should transmit the frame, the input port number, or VLAN information. The PVQ 235 may decode the forwarding descriptor to obtain the frame pointer. The PVQ 235 may then supply the frame pointer to the appropriate output queues within the output control queues 240.

The IRC 245 may also perform layer 3 filtering. For example, the IRC 245 may examine each received data packet for up to 128 programmable patterns and process the packet based on the result. The result may dictate that the IRC 245 drop the packet, forward the packet to the host 160, or assign a user priority or a Differentiated Services Code Point (DSCP) to the packet. User priorities and the DSCP may be independently mapped into output priority classes.

The registers 250 may include configuration and status registers used by the host interface 260. The MIB counters 255 may provide statistical network information in the form of MIB objects for use by the host 160. The host interface 260 may include a standard interface that permits an external management entity, such as the host 160, to control the overall operation of the multiport switch 180. The host interface 260 may decode host accesses within a prescribed register space and read and write configuration and status information to and from the registers 250.

The external memory interface 265 may include a standard interface that permits access to the external memory 170. The external memory interface 265 may permit external storage of packet data in the external memory 170 in a direct memory access (DMA) transaction during an assigned time slot determined by the scheduler 220. In an implementation consistent with the present invention, the external memory interface 265 operates at a clock frequency of at least 66 MHz and, preferably, at a frequency of 100 MHz or above.

The EEPROM interface 270 may include a standard interface to another external memory, such as an EEPROM. The LED interface 275 may include a standard interface to external LED logic. The LED interface 275 may send the status of conditions of the input and output ports to the external LED logic. The LED logic may drive LED display elements that are human-readable. The JTAG interface 280 may include a standard interface to external testing equipment to permit, for example, a boundary scan test to be performed on the multiport switch 180.

The foregoing description of the switch architecture provides an overview of the switch operations in a packet switched network. A more detailed description of the features of the present invention as embodied, for example, in network 100 is provided below.

Source-Based Flow Control Across Multiple Devices

The present invention is directed to a source-based flow control mechanism in a network device, such as multiport switch 180. The present invention modifies a conventional MAC control pause frame to include a source address field relating to the source of the congestion. The multiport switch 180, consistent with the present invention, identifies a source address associated with a congestion condition and transmits a MAC control pause frame including the identified source address. A second switch receives the MAC control pause frame and suspends transmission to multiport switch 180 of data frames having the source address included in the pause frame. The second switch may also identify the port associated with the source address included in the pause frame. The second switch may then transmit a similar MAC control pause frame on the port associated with the source address.

Figure 3:
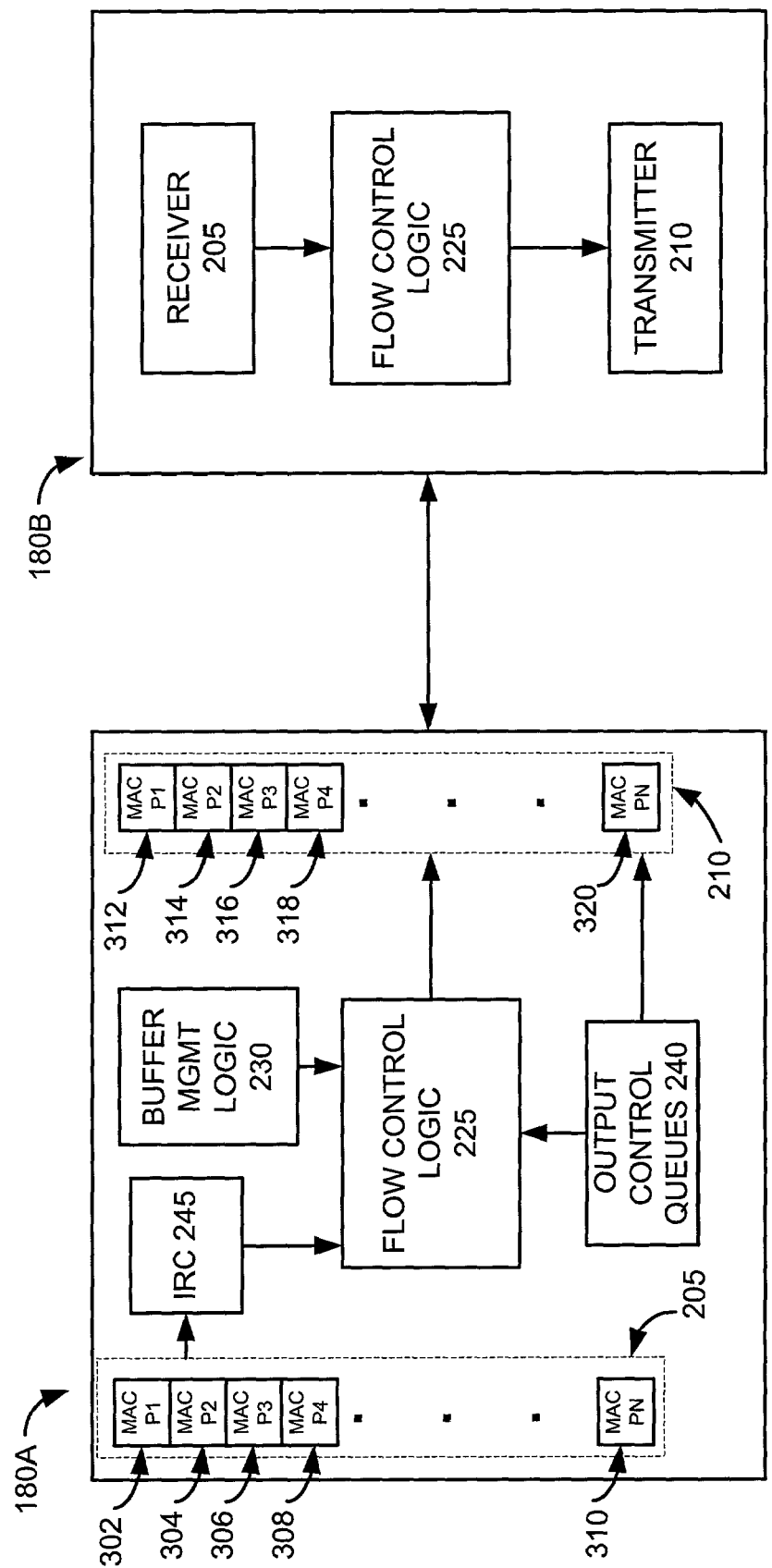
FIG. 3 is a block diagram illustrating a portion of two multiport switches in an exemplary implementation consistent with the present invention.

FIG. 3 illustrates an exemplary implementation of the present invention in which two multiport switches, labeled 180A and 180B, are coupled together. Only two switches are shown for simplicity. It should be understood that additional network devices may be coupled together in implementations of the present invention. In addition, only a portion of multiport switches 180A and 180B are illustrated. It should be understood that multiport switches 180A and 180B may be configured similar to the multiport switch 180 illustrated in FIG. 2.

Multiport switch 180A includes receiver 205, transmitter 210, flow control logic 225, buffer management logic 230, output control queues 240 and IRC 245. Receiver 205 may include a number of MAC receive modules 302–310, labeled MAC P1 through MAC PN, corresponding to input ports 1 through N. Transmitter 210 may include a number of MAC transmit modules 312–320, labeled MAC P1 through MAC PN, corresponding to output ports 1 through N.

The buffer management logic 230, as discussed previously, manages the use of frame pointers that identify locations available in external memory 170 for storing data frames while data forwarding information is generated on the multiport switch 180A. The output control queues 240 include FIFOs corresponding to each of the transmit modules 312–320 in transmitter 210. The IRC 245, as described previously, makes frame forwarding decisions for data packets received by receiver 205.

The flow control logic 225, as described previously, includes logic for making flow control decisions. Such flow control decisions may include, for example, receiving congestion-related information and generating MAC control pause frames. Flow control logic 225, as described in more detail below, interacts with data frame processing logic, such as buffer management logic 230, output control queues 240 and IRC 245, to determine when to generate MAC control pause frames. The flow control logic 225 may generate a MAC control pause frame including the "offending" source address information (i.e., the source address of the particular data frame associated with causing the congestion) and transmits the MAC control pause frame via network 100 to multiport switch 180B.

Multiport switch 180B includes receiver 205, transmitter 210 and flow control logic 225. As discussed previously, multiport switch 180B may be configured similar to multiport switch 180A.

Figure 4:
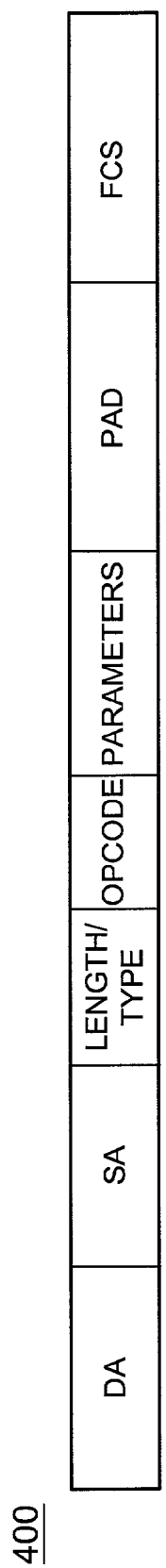
FIG. 4 is a block diagram of a conventional pause frame.

The present invention modifies a conventional MAC control pause frame to include source address information relating to the source of congestion on a network device, such as multiport switch 180A. FIG. 4 illustrates a conventional MAC control pause frame 400 in accordance with IEEE 802.3. The MAC control pause frame 400 may be transmitted to stations that are configured for full-duplex operations. Referring to FIG. 4, the MAC control pause frame 400 includes the following fields: destination address (DA), source address (SA), length/type, opcode, parameters, pad and frame check sequence (FCS). It should be understood that preamble and start-of-frame delimiter (SFD) information may also be transmitted with MAC control pause frame 400.

The destination address field is six bytes in length and includes a multicast MAC address. That is, in conventional network devices, the MAC control pause frame 400 is multicast from each of the transmit ports included on the network device. As such, the destination address field includes an address recognized as a multicast address so that each port will transmit the pause frame 400. The SA field is also six bytes in length and may be set to the address of the station sending the MAC control pause frame 400. In the situation in which the multiport switch 180A transmits the MAC control pause frame 400, the SA may be set to the address assigned to the multiport switch 180A.

The length/type field is two bytes in length and identifies frame 400 as a MAC control frame. According to conventional methodology, this field may be set to the value 8808 (hexadecimal). The opcode field is two bytes and identifies the MAC control frame as a pause frame. According to conventional methodology, the opcode may be set to the value 0001 (hex). The parameters field is two bytes and includes a pause time parameter. The pause time parameter defines the length of time that the receiving station is requested to suspend data transmissions. The pause time may be measured in units of pause quanta, with each unit equal to 512 bit times. If a station(s) transmits a pause frame with the pause time set to 1000 (decimal), the receiving station(s) should inhibit transmission of frames for (1000) (512) or 512,000 bit times. A bit time is equal to 100 nanoseconds (ns) for 10 Mb Ethernet, 10 ns for 100 Mb Ethernet and 1 ns for 1 Gb Ethernet.

The pad field is used when the parameters field does not fill the fixed length of a MAC control frame. The pad field is transmitted with zeros and its size is determined by the size of the parameters field and the minimum frame size. The FCS field is four bytes in length and includes a cyclic redundancy check (CRC) code appended to the MAC control pause frame 400.

The present invention, as described in more detail below, modifies the conventional MAC control pause frame 400 to include a source address field that identifies the source address of the data frame that is associated with causing the congestion. This modified pause frame may then be transmitted through the network 100 (FIG. 1). In this manner, if a resource on the multiport switch 180A becomes congested, the multiport switch 180A may selectively request suspension of data transmissions from a particular source address.

Figure 5:
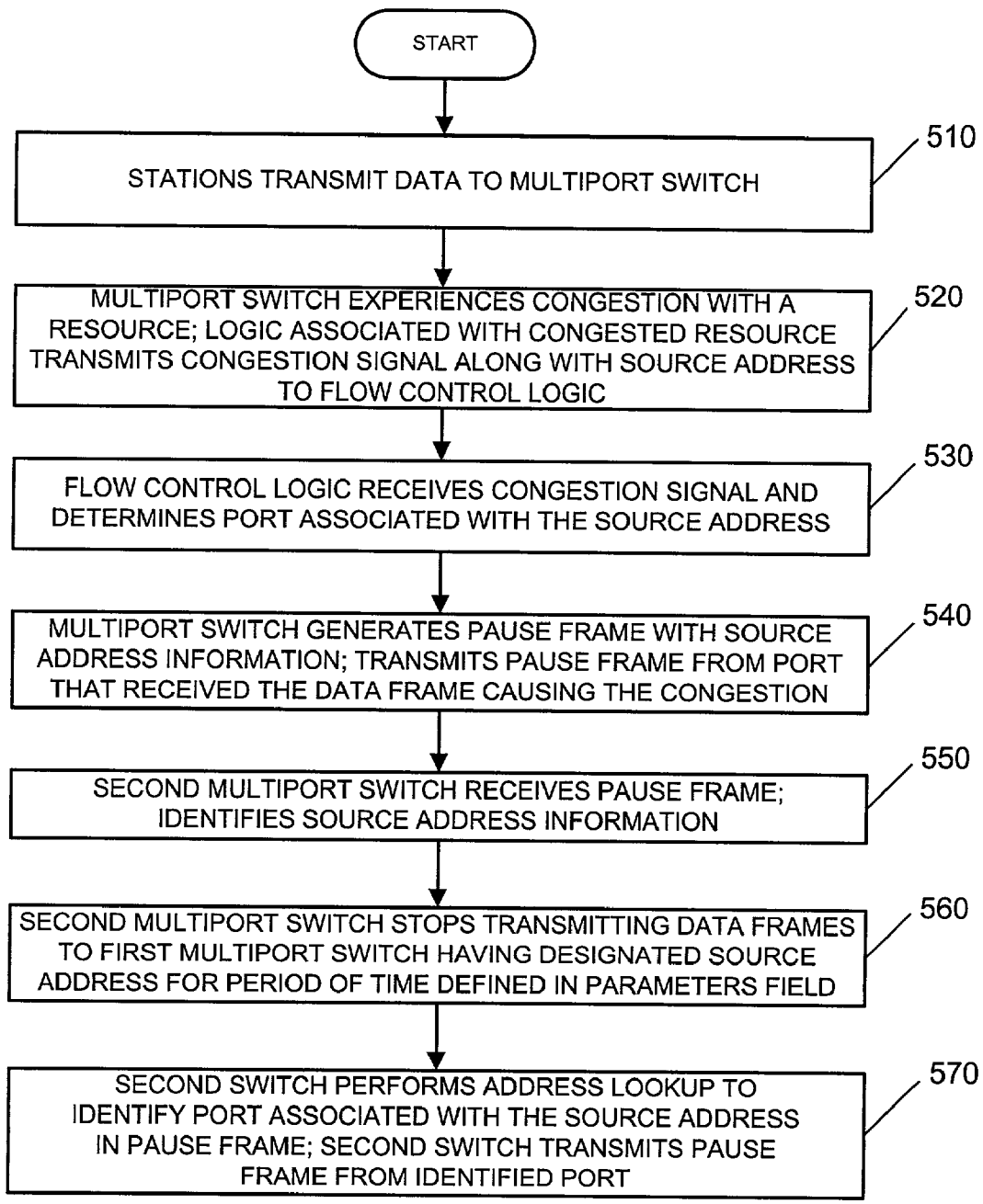
FIG. 5 is a flow diagram illustrating processing for performing flow control, according to an exemplary implementation consistent with the present invention.

FIG. 5 illustrates exemplary processing for performing flow control, consistent with an implementation of the present invention. Processing begins upon start-up of multiport switches 180A and 180B in network 100. Assume that the network stations 110 and node 150 are transmitting data packets to the multiport switch 180A [step 510]. Further assume that the multiport switch 180A experiences "congestion" with a resource associated with processing the received data frames [step 520].

For example, in an implementation consistent with the present invention, a congestion condition may occur when the number of available frame pointers in a free buffer queue located in buffer management logic 230 reaches a predetermined threshold. The frame pointers identify locations in external memory 170 for storing data frames while they are being processed on multiport switch 180A. In this situation, the buffer management logic 230 may transmit a congestion signal to flow control logic 225. The congestion signal may indicate that congestion exists and may also indicate the source address of the packet that caused the congestion. For example, the congestion signal may include the source address of the data packet that caused the free buffer queue to reach the predetermined threshold.

Another congestion condition may occur when an IRC input queue in IRC 245 reaches a predetermined number of entries. For example, the IRC 245 may include an input queue corresponding to each port on the multiport switch 180A. When one of the input queues reaches a predetermined number of entries, the IRC 245 may signal a congestion condition to flow control logic 225 that identifies that congestion exists. The congestion signal may also indicate the source address of the packet that caused the congestion.

Still another congestion condition may occur when the output control queues 240 become congested. For example, the output control queues 240 (FIG. 2) of multiport switch 180 may include an individual queue corresponding to each output port supported by the multiport switch 180A. Each queue associated with each respective port may be further subdivided into a low priority queue and a high priority queue. The high and low priority queues, respectively, store frame forwarding information associated with high and low priority frames received by the multiport switch 180A. A high priority frame may include a frame that requires lower access latency, such as a frame destined for a management device or a frame for a multimedia application. In alternative embodiments, each queue associated with each port may include additional queues associated with frames having different levels of priority. An output queue may be considered congested when the queue is full or nearly full (i.e., the number of entries in the queue is above a predetermined threshold). In either case, when output control queues 240 logic detects congestion in one of the output queues, the output control queue 240 logic may transmit a congestion signal to flow control logic 225. The congestion signal may indicate that a congestion condition exists and may also indicate the source address of the packet that caused the congestion.

A number of other congestion conditions may occur on multiport switch 180A when various resources associated with processing the received data frames are unable or nearly unable to perform their intended functions. In each case, the logic block that experiences the congestion (e.g., IRC 245, buffer management logic 230, output control queues 240, etc.) transmits a congestion signal to flow control logic 225 [step 520]. The congestion signal indicates that congestion exists and includes the source address of the data packet associated with the congestion.

The flow control logic 225 receives the congestion signal with the source address information [step 530]. The flow control logic 225 may then perform an address lookup to determine the port on which the data frame associated with the source address included in the congestion signal was received [step 530].

The flow control logic 225 may then generate a MAC control pause frame including this source address information [step 540]. For example, as described previously, the conventional MAC control pause frame 400 does not include address information pertaining to the source of the congestion. The present invention modifies the conventional MAC control pause frame 400 to include such information.

Figure 6:
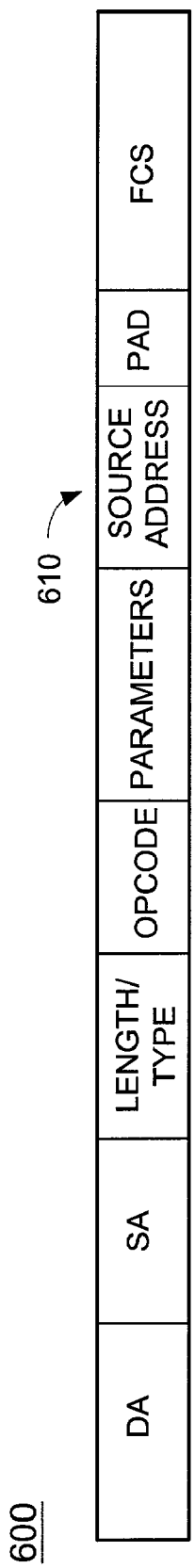
FIG. 6 is an exemplary diagram of a pause frame, according to an implementation consistent with the present invention.

For example, FIG. 6 illustrates an exemplary MAC control pause frame 600 consistent with an implementation of the present invention. Referring to FIG. 6, the MAC control pause frame 600 may include DA, SA, length/type, opcode, parameters, pad and FCS fields, as used in conventional MAC control pause frame 400. Preamble and SFD information may also be transmitted with MAC control pause frame 600. The MAC control pause frame 600 also includes a source address field 610 that identifies the source address associated with the frame causing the congestion. The conventional MAC control pause frame 400 also includes a source address field. However, as described previously, the SA field in MAC control pause frame 400 corresponds to the SA field in MAC control pause frame 600. These SA fields identify the source address of the device transmitting the pause frame. In other words, the SA fields in MAC control pause frames 400 and 600 identify the address for multiport switch 180A. The source address field 610, in contrast, stores the source address associated with the data frame causing the congestion.

The multiport switch 180A may then transmit the MAC control pause frame 600 via the particular port identified by the DA [step 540]. As discussed previously, in conventional network devices, the DA of a conventional MAC control pause frame, such as pause frame 400, is set to a multicast address that identifies all of the ports on the network device. The present invention, in contrast, transmits the MAC control pause frame 600 via the port, identified at step 530, that received the data frame that caused the congestion [step 540].

Assume that multiport switch 180B receives the MAC control pause frame 600 [step 550]. The multiport switch 180B determines that the frame is a control pause frame and that the MAC control pause frame 600 includes source address information relating to the source of the congestion. It should be noted that the multiport switches 180A and 180B may be configured to recognize two types of MAC control pause frames. For example, multiport switches 180A and 180B may recognize standard MAC control pause frames, such as frame 400, and modified MAC control pause frame, such as frame 600.

In one implementation consistent with present invention, the multiport switches 180A and 180B may coordinate the use of the modified MAC control pause frame 600 using the Auto-Negotiation feature defined in the IEEE 802.3 standard. For example, the multiport switch 180A may use the Next Page function, defined in the Auto-Negotiation protocol, to transmit a message to each of the other multiport switches in network 100 indicating that a source address field may be included in the MAC control pause frame. In this manner, the devices receiving the modified MAC control pause frame 600 will be aware of the particular details involving the source address field 610. Alternatively, other conventional communication mechanisms may be used to ensure that the multiport switches 180A and 180B are able to adequately communicate and identify the source address field 610 included in the MAC control pause frame 600. However, it should be understood that both multiport switches 180A and 180B may be configured to recognize the source address information in source address field 610 without using additional signaling.

In any event, the multiport switch 180B identifies the source address in source address field 610 [step 550]. The multiport switch 180B may then suspend transmissions to multiport switch 180A of data frames with this same source address for the period of time defined by the pause time parameter in the parameters field of MAC control pause frame 600 [step 560]. The multiport switch 180B, however, may continue to transmit data frames to multiport switch 180A having other source addresses. In this manner, adding a source address field 610 to a pause frame advantageously enables the multiport switch 180B to continue to transmit data frames to multiport switch 180A and maintain high data throughput even when congestion caused by a particular source address occurs.

The multiport switch 180B may also perform an address lookup operation to identify the port associated with the source address in source address field 610 [step 570]. The multiport switch 180B may then send out a MAC control pause frame 600 including source address field 610 from this identified port [step 570].

This process may be repeated in every switch that receives the MAC control pause frame 600 until the MAC control pause frame 600 reaches an end node or until a switch included in the network 100 is not configured to recognize the modified MAC control pause frame 600. This enables a network, such as network 100, to achieve source-based, end-to-end flow control.

Described has been an apparatus and method for performing source-based flow control across a number of devices in a network. One advantage of the present invention is that multiport switch 180A may selectively request suspension of data traffic having a designated source address. This enables the multiport switch 180A to continue receiving data frames having other source addresses while the congestion clears, thereby increasing data throughput. Another advantage of the invention is that the multiport switch 180A transmits MAC control pause frames 600 via ports associated with the congestion, thereby avoiding multicasting pause frames that may be ignored by receiving devices.

Only the preferred embodiments of the invention and a few examples of its versatility are shown and described in the present disclosure. It is to be understood that the invention is capable of use in various other combinations and environments and is capable of modifications within the scope of the inventive concept as expressed herein.

For example, the present invention has been described with the example of two multiport switches 180A and 180B. It should be understood, however, that the present invention may be employed in networks including any number of switches. Additionally, the present invention has been described with the example of source address field 610 included in particular portion of a MAC control pause frame. It should be understood that the source address field 610 may be included in any portion of the MAC control pause frame.

The present invention has also been described with examples of the source address field 610 being associated with a data packet that caused a resource on multiport switch 180A to become congested. For example, in one of the scenarios described, a data packet that caused a particular queue to become congested was identified as the offending data packet (i.e., the packet that caused the congestion). The source address associated with the offending packet was then inserted into source address field 610. In other implementations of the present invention, the relevant logic block (e.g., IRC 245, buffer management logic 230, output control queues 240, etc.) may examine the data frames being processed and identify the cause of the congestion based on various factors.

For example, the IRC 245 may determine that a large percentage of the frame headers in a congested IRC input queue have the same source address. In this case, the IRC 245 may identify this particular source address as causing the congestion condition and may forward this source address to flow control logic 225. The flow control logic 225 may then insert this source address into source address field 610. Therefore, in implementations of the present invention, the relevant logic block may examine the data frames being processed and determine the cause of the congestion based on any number of factors. The relevant logic block may then forward the source address associated with the cause of the congestion to flow control logic 225, where it is inserted into source address field 610.

What is claimed is:

1. A first network device configured to control communications in a network, comprising:
    a logic device configured to detect a condition associated with a resource on the first network device;
    flow control logic configured to generate a pause frame requesting suspension of data traffic in response to the detection of the condition, the pause frame including a first source address corresponding to the source address of the first network device, a destination address and a second source address, the second source address being associated with an other network device and identifying the source address of a data frame associated with the condition; and
    a transmit device configured to transmit the pause frame to at least a second network device.

2. The first network device of claim 1, wherein the condition represents a congestion condition.

3. The first network device of claim 2, wherein the second source address identifies the source address of the data frame that caused the congestion condition.

4. The first network device of claim 1, wherein the logic device is further configured to signal a congestion indication to the flow control logic in response to detecting the condition, the congestion indication including source address information identifying the second source address.

5. The first network device of claim 4, further comprising:
    a plurality of ports for receiving and transmitting data frames, and
    the flow control logic being further configured to:
        identify one of the plurality of ports that received the data frame that caused the congestion, and
        transmit the pause frame from the one port.

6. The first network device of claim 1, wherein the second network device suspends transmission to the first network device of data frames having the second source address included in the pause frame for a period of time defined in the pause frame and continues transmission to the first network device of data frames having source addresses other than the second source address included in the pause frame during the period of time defined in the pause frame.

7. The first network device of claim 1, wherein the logic device is configured to detect the condition when a predetermined number of entries are stored in at least one of an input queue and an output queue associated with one of a plurality of ports on the first network device.

8. The first network device of claim 1, wherein the transmit device is further configured to communicate information to the second network device using an auto-negotiation feature, the information relating to the second source address in the pause frame.

9. In a network for controlling communications, a method comprising:
    receiving data frames on input ports of a first network device;
    processing the received data frames to generate data forwarding information;
    transmitting the received data frames via output ports on the first network device to their intended destinations based on the data forwarding information;
    detecting a condition on the first network device;
    generating a pause frame requesting suspension of data traffic in response to detecting the condition, the pause frame including a first source address associated with the first network device, a destination address and a second source address of a received data frame associated with the condition wherein the second source address is associated with a network device other than the first network device; and transmitting the pause frame to at least a second network device.

10. The method of claim 9, wherein the detecting a condition includes detecting a congestion condition, the second source address included in the pause frame identifying the source address of the received data frame that caused the congestion condition.

11. The method of claim 9, further comprising:
signaling a congestion indication in response to detecting the condition, the congestion indication including the second source address identifying the source address of the received data frame that caused the congestion.

12. The method of claim 9, wherein the condition represents a congestion condition, the method further comprising:
identifying a port on the first network device that received the data frame that caused the congestion condition; and
transmitting the pause frame from the identified port.

13. The method of claim 9, further comprising:
receiving the pause frame at the second network device;
suspending transmission by the second network device to the first network device of data frames having the second source address for a period of time defined in the pause frame; and
continuing transmission by the second network device to the first network device of data frames having source addresses other than the second source address during the period of time defined in the pause frame.

14. The method of claim 9, further comprising:
receiving the pause frame at the second network device;
identifying the second source address included in the pause frame;
determining a port on the second network device associated with the second source address; and
transmitting a second pause frame including the second source address to at least a third network device via the port on the second network device associated with the second source address.

15. A data communication system, comprising:
a first device configured to:
receive data frames,
detect a congestion condition associated with processing the received data frames,
generate a first pause frame requesting suspension of data transmissions in response to the congestion condition, the first pause frame including a source address of a data frame associated with the congestion condition wherein the source address is associated with a device other than the first device, and
transmit the first pause frame; and a second device configured to:
receive the first pause frame from the first device,
identify the source address included in the first pause frame,
suspend transmission to the first device of data frames having the identified source address during a period of time defined in the first pause frame,
continue transmission to the first device of data frames having source addresses other than the identified source address during the period of time defined in the first pause frame,
determine a port on the second device associated with the identified source address, and
transmit a second pause frame including the identified source address to at least a third device via the port associated with the identified source address.

16. The data communication system of claim 15, wherein the source address of the data frame included in the first pause frame identifies a network device that transmitted the data frame associated with causing the congestion condition.

17. The data communication system of claim 15, the first device being further configured to:
identify an input port on the first device that received the data frame that caused the congestion, and
forward the first pause frame to an output port corresponding to the input port that received the data frame.

18. In a network including a number of network stations and a plurality of network devices configured to control communication of data frames between the network stations, a first network device, comprising:
a receive device configured to receive a data frame from a second network device; and
data frame processing logic configured to:
identify the received data frame as a pause frame, the pause frame including a first source address, a destination address and a second source address, the second source address being associated with a network device other than the first network device,
suspend transmission to the second network device of data frames having the second source address for a period of time defined in the pause frame, and
continue transmission to the second network device of data frames having source addresses other than the second source address during the period of time defined in the pause frame.

19. The first network device of claim 18, the data frame processing logic being further configured to:
identify the second source address included in the pause frame,
determine a port on the first network device associated with the identified second source address, and
transmit a second pause frame including the identified second source address to at least a third network device via the port associated with the identified second source address.

* * * * *